UNITED STATES PATENT OFFICE.

LEVI HAAS, OF CHESTER, PENNSYLVANIA.

FERTILIZER.

SPECIFICATION forming part of Letters Patent No. 327,256, dated September 29, 1885.

Application filed November 8, 1884. (No specimens.)

*To all whom it may concern:*

Be it known that I, LEVI HAAS, a citizen of the United States of America, residing at Chester, in the county of Delaware and State of Pennsylvania, have invented certain new and useful Improvements in Insect-Preventives, of which the following is a specification.

My invention pertains to an improved insect preventive and fertilizer. In the process of preparing it I take seventy per cent. of pulverized furnace-slag, ten per cent. of salt, ten per cent. of coal or wood ashes, and ten per cent. of charcoal, and these ingredients I thoroughly commingle into a homogeneous mass, and water, mingled with five per cent. of muriatic or sulphuric acid, is added thereto.

My insect-preventive and fertilizer has a two fold purpose, since it is designed not only to destroy such insects as prey upon vegetables and fruit-trees, but also as a fertilizer, however applied. It is usually applied around the stalks of vegetables and the trunks and roots of trees, because it is here that parasite insects most usually deposit their larvæ, and when it is applied in the early spring, prior to the development of insect life, such larvæ is thus destroyed where it chiefly abounds and propagates, and the germs being destroyed, development of insect-life is prevented. In applying it in the latter part of spring, or later in the season, to plants which have already been overrun with potato-bugs, borers, and other parasites, its destructive properties are still further augmented by the addition of about five per cent. of paris-green, thoroughly blended and intermingled with the compound, and when employed solely as a fertilizer, guano and hen or barnyard manure are added thereto.

Having thus fully described my invention, what I claim, and desire to secure by Letters Patent, is—

The herein-described composition of material to be used as an insect-preventive and fertilizer, consisting of furnace-slag, about seventy per cent.; salt, about ten per cent.; ashes, about ten per cent.; charcoal, about ten per cent., mixed with water to which has been added five per cent. of muriatic or sulphuric acid.

In testimony whereof I affix my signature in presence of two witnesses.

LEVI HAAS.

Witnesses:
 REECE L. THOMAS,
 CHAS. C. LARKIN.